United States Patent [19]
Yano

[11] Patent Number: 5,227,919
[45] Date of Patent: Jul. 13, 1993

[54] ZOOM LENS

[75] Inventor: Koutaro Yano, Kanagawa, Japan

[73] Assignee: Canon Kabushiki Kaisha, Tokyo, Japan

[21] Appl. No.: 963,264

[22] Filed: Oct. 19, 1992

Related U.S. Application Data

[63] Continuation of Ser. No. 717,023, Jun. 18, 1991, abandoned.

[30] Foreign Application Priority Data

Jun. 22, 1990 [JP] Japan .................................. 2-164908
Jul. 25, 1990 [JP] Japan .................................. 2-198861

[51] Int. Cl.$^5$ .............................................. G02B 15/14
[52] U.S. Cl. ..................................... 359/690; 359/687
[58] Field of Search ............... 359/676, 677, 689, 690, 359/683, 687

[56] References Cited

U.S. PATENT DOCUMENTS 4,758,073 7/1988 Moskovich ......................... 359/690

Primary Examiner—Scott J. Sugarman
Attorney, Agent, or Firm—Fitzpatrick, Cella, Harper & Scinto

[57] ABSTRACT

A zoom lens is disclosed comprising, in the order from a large conjugate side, a first lens unit of positive power, a second lens unit of negative power and a third lens unit of positive power, wherein when zooming from the wide-angle end to the telephoto end, the separation between the first and second lens units increases, the separation between the second and third lens units decreases, and the third lens unit moves toward the large conjugate side, the zoom lens satisfying the following conditions:

$$0.3 < e_{IIW}/f_W < 0.6$$

$$1.5 < -(1/f_I + 1/f_{II}) \cdot f_W < 2.0$$

$$0.3 < -f_{II}/f_W < 0.45$$

where $f_W$ is the focal length of the entire lens system at the wide-angle end, $f_I$ and $f_{II}$ are the focal lengths of the first and second lens units respectively, and $e_{IIW}$ is an interval between principal points of the second and third lens units at the wide-angle end.

7 Claims, 17 Drawing Sheets

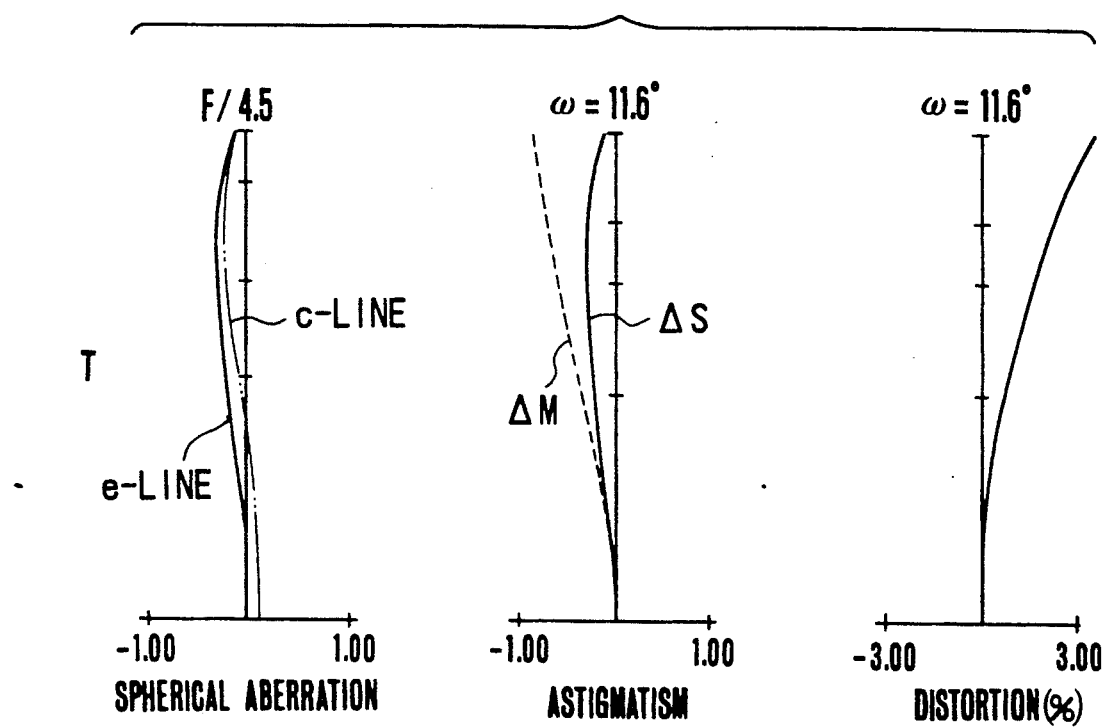

ZOOM LENS

This application is a continuation of application Ser. No. 07/717,023 filed Jun. 18, 1991 now abandoned.

BACKGROUND OF THE INVENTION

1. Field of the Invention

This invention relates to zoom lenses and, more particularly, to zoom lenses suited to projection.

2. Description of the Related Art

Referring first to FIG. 7, there is shown a commonly available projection type television set which projects an image from the color liquid crystal picture display onto a screen, comprising a white light source 1 issuing collimated light rays, liquid crystal display elements 2 (2a, 2b, 2c), reflection mirrors 3 (3a, 3b), red, green and blue reflection dichroic mirrors 4, 5 and 6 respectively, and a projection lens 7. Under the use of such a construction and arrangement, necessity arises that at least two mirrors such as the reflection mirrors or dichroic mirrors be disposed in each of the spaces (back focal spaces) from the last surface of the projection lens 7 to the liquid crystal display elements. From this reason, a long back focal distance must be made up in any way.

To increase the back focal distance and simplify the structure, it can be considered to construct a zoom lens in such a way that a lens unit having a negative refractive power precedes and is followed by a lens unit having a positive refractive power, or so-called "2-unit" type zoom lens. However, this gives rise to a problem in that the total zooming movement of the second lens unit, when counted from the front, becomes very long, which in turn causes the physical length of the entire system of the zoom lens to increase.

SUMMARY OF THE INVENTION

With such problems in mind, the present invention is to provide a zoom lens which secures a relatively long back focal distance, while still permitting a minimization of the size to be achieved with preservation of good optical performance.

The invention has its features characterized in that a zoom lens comprises, in the order from a large conjugate side, a first lens unit having a positive refractive power, a second lens unit having a negative refractive power and a third lens unit having a positive refractive power, wherein when zooming from a wide-angle end to a telephoto end, a separation between the first and second lens units increases, a separation between the second and third lens units decreases, and the third lens unit moves toward the large conjugate side, whereby letting the focal length of the entire lens system at the wide-angle end be denoted by $f_W$, the focal lengths of the first and second lens units by $f_I$ and $f_{II}$ respectively, and an interval between principal points of the second and third lens units at the wide-angle end by $e_{IIW}$, the following conditions are satisfied:

$$0.3 < e_{IIW}/f_W < 0.6 \quad (1)$$

$$1.5 < -(1/f_I + 1/f_{II}) \cdot f_W < 2.0 \quad (2)$$

$$0.3 < -f_{II}/f_W < 0.45 \quad (3)$$

BRIEF DESCRIPTION OF THE DRAWINGS

FIGS. 4(A), 4(B) and 4(C), FIGS. 5(A), 5(B) and 5(C), and FIGS. 6(A), 6(B) and 6(C) are graphic representations of the various aberrations of the lenses of FIGS. 1 to 3 respectively appearing on the small conjugate plane disposed at a distance of 3/100 in magnification in the wide-angle end.

Of the aberration graphs, the ones labeled W are in the wide-angle end, the ones M in the intermediate position, and the others T in the telephoto end.

DETAILED DESCRIPTION OF THE PREFERRED EMBODIMENTS

The zoom lens of the invention is described by reference to the drawings.

Figure 1:
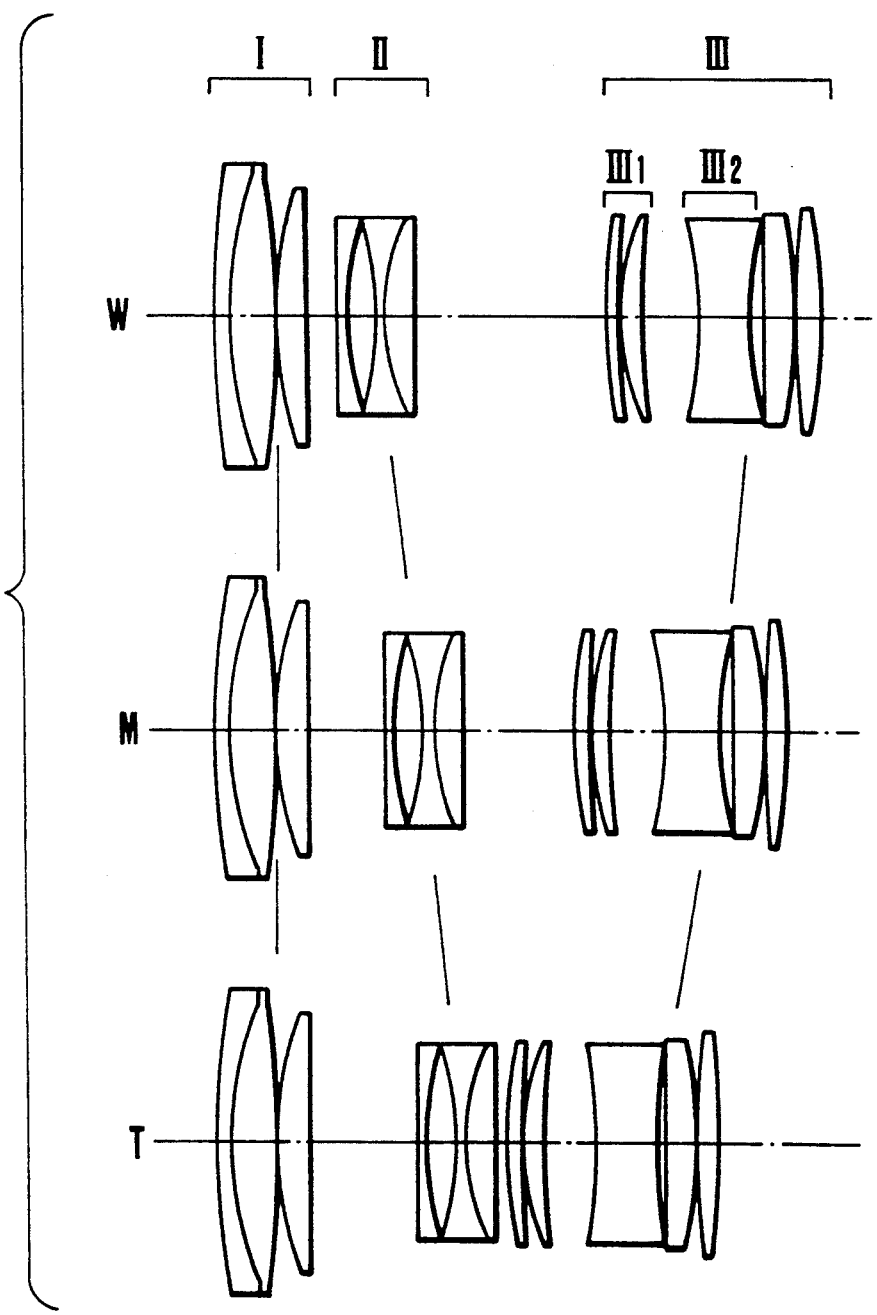
FIG. 1 to FIG. 3 are longitudinal section views of numerical examples 1 to 3 of zoom lenses of the invention, respectively.
Figure 2:
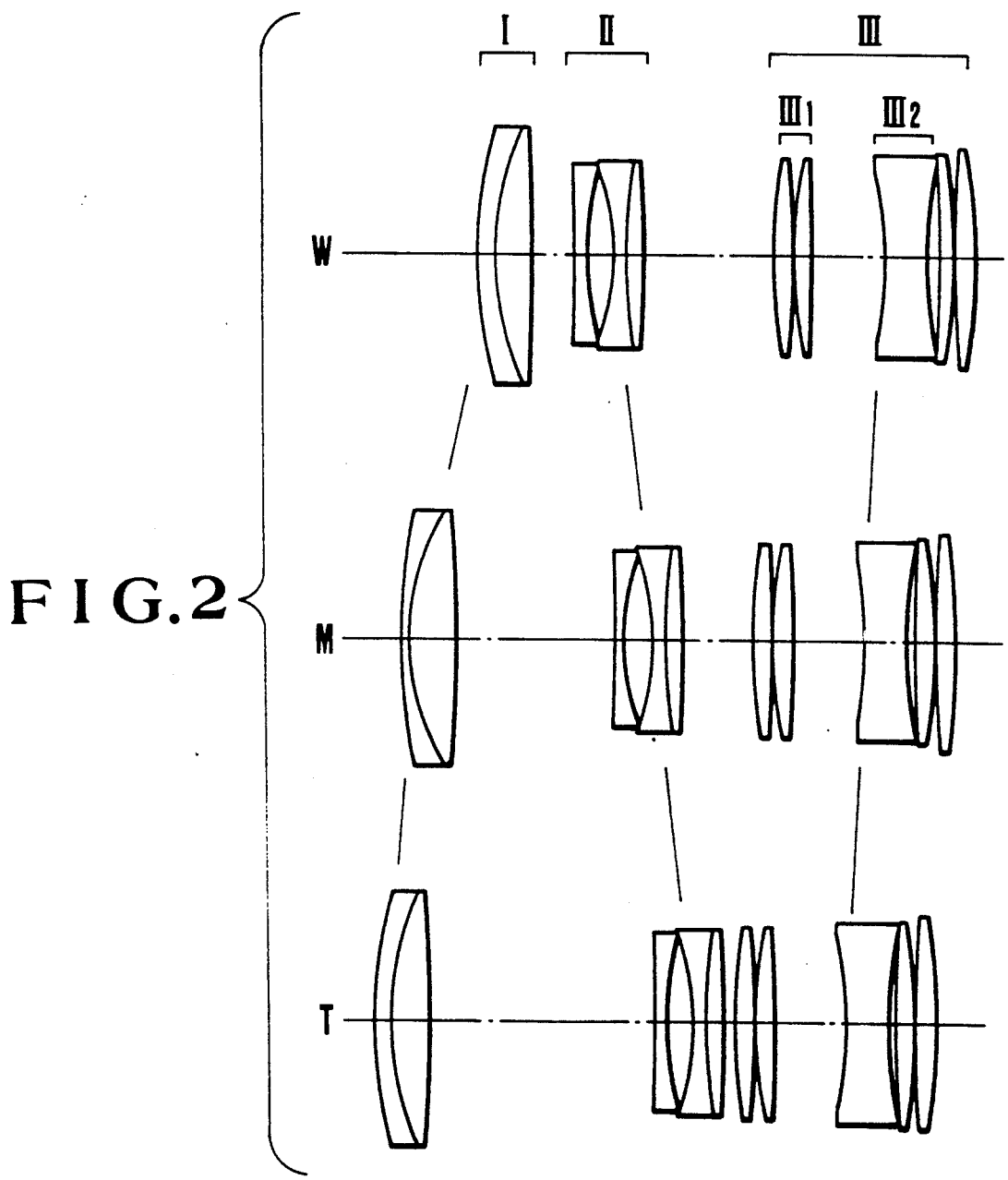
Figure 3:
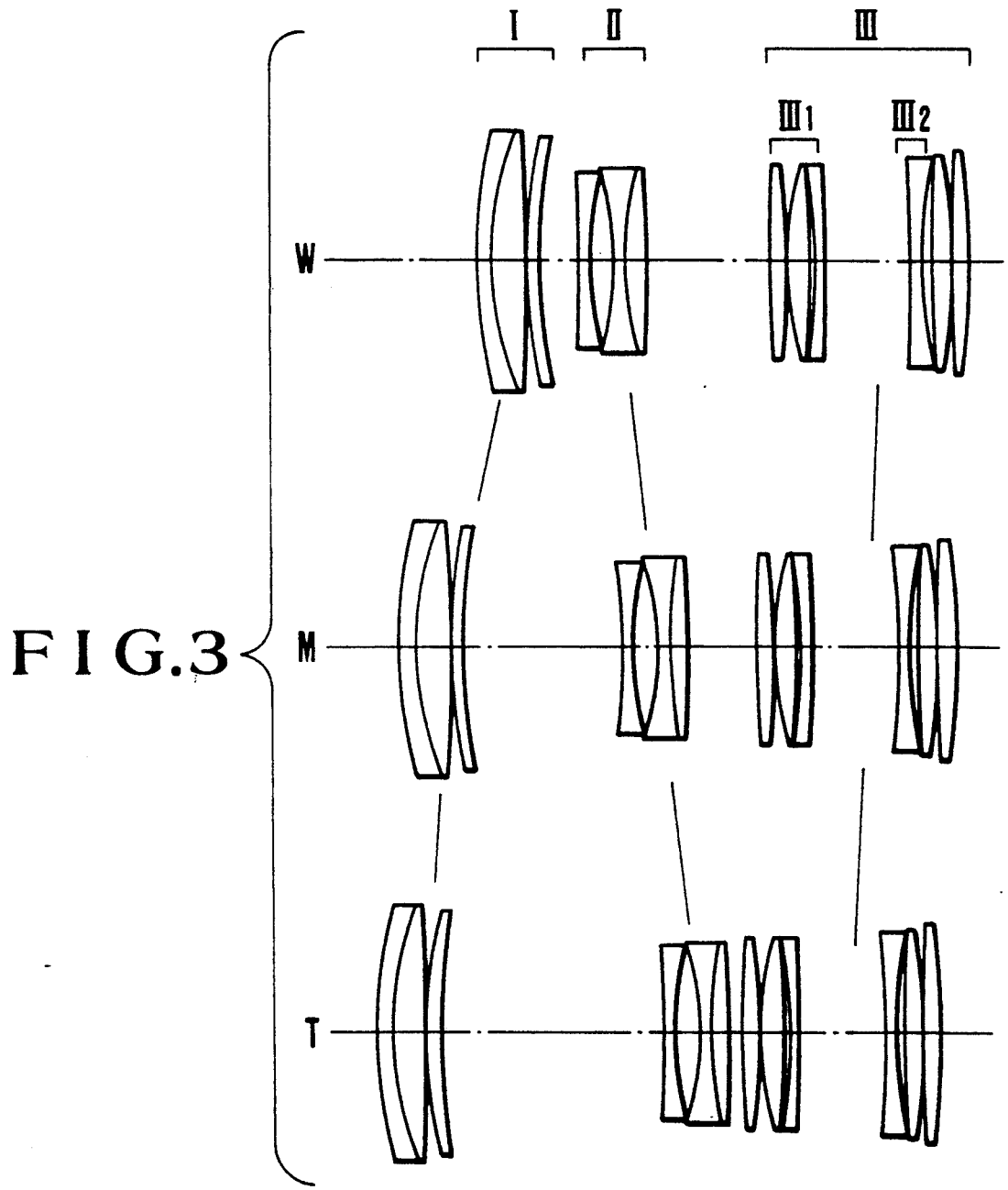
Figure 4A:
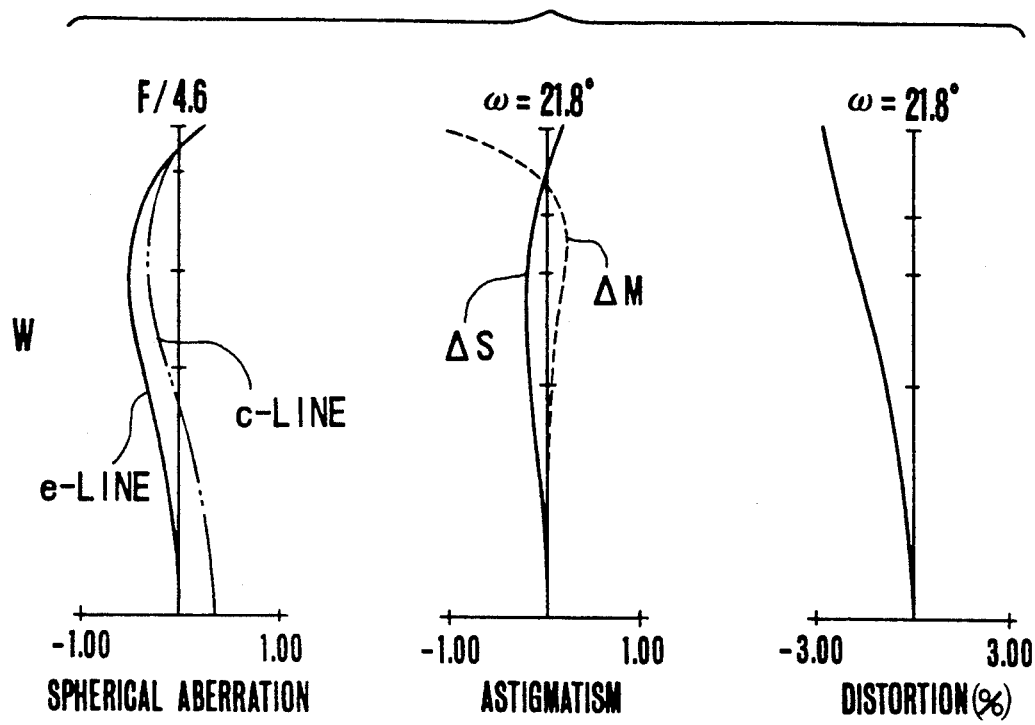
Figure 4B:
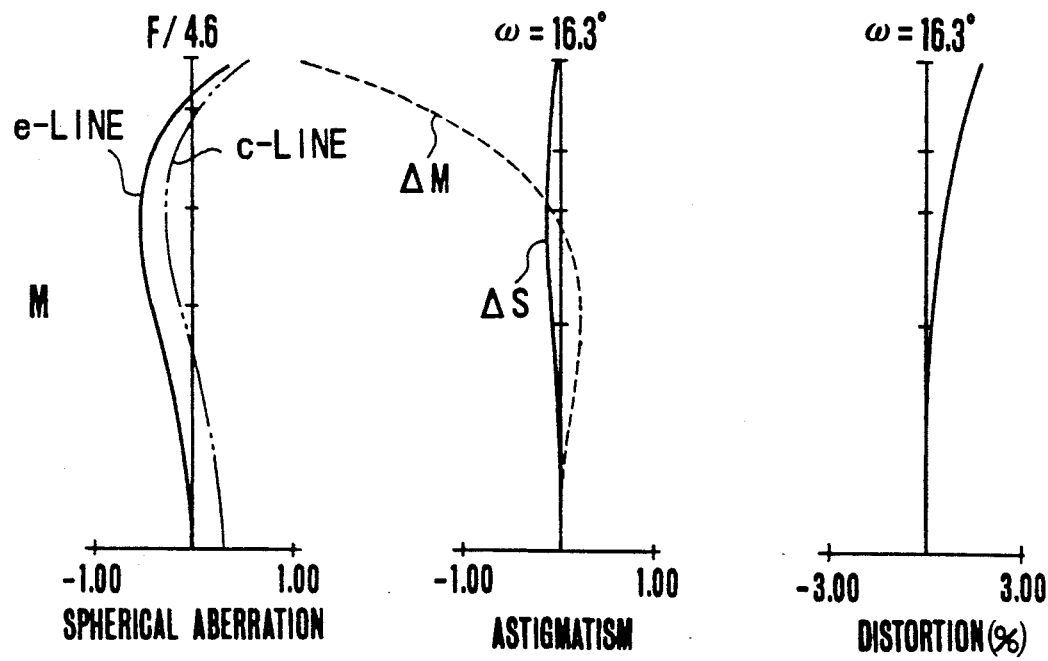
Figure 4C:
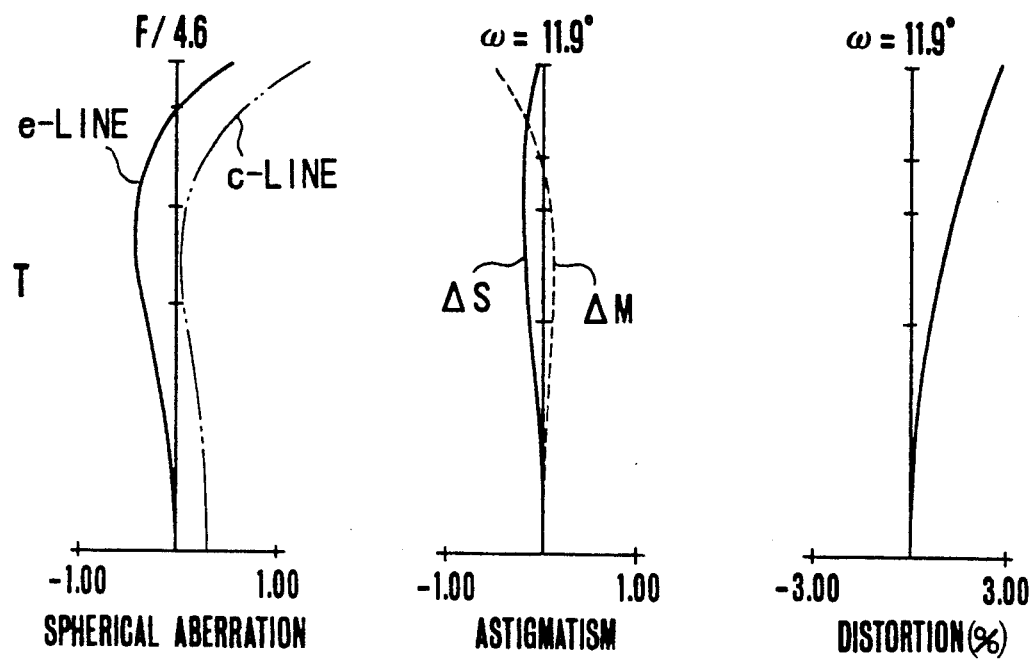
Figure 5A:
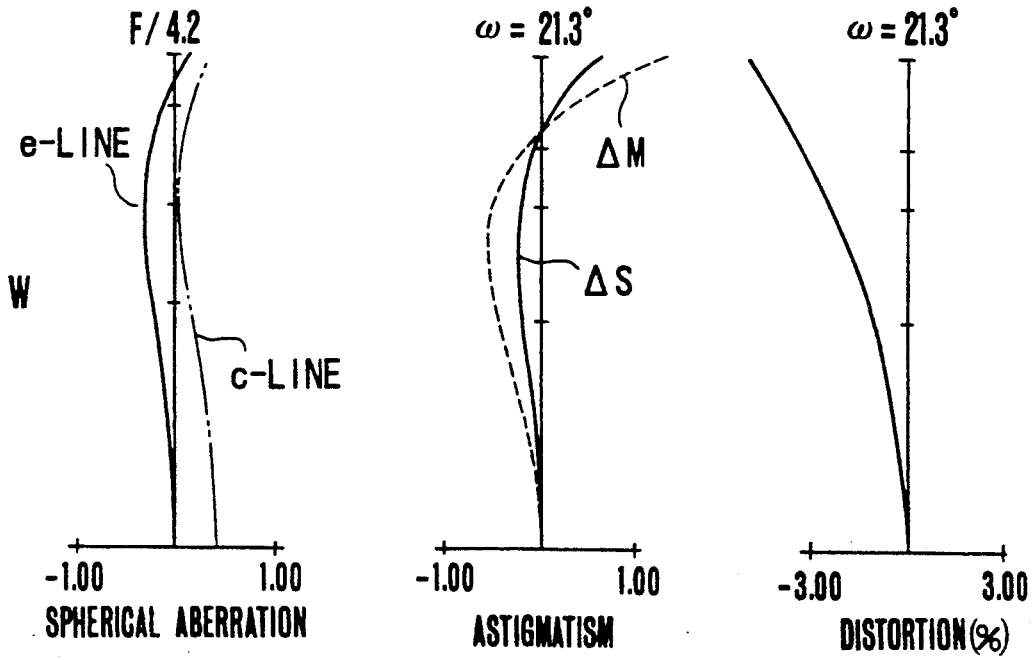
Figure 5B:
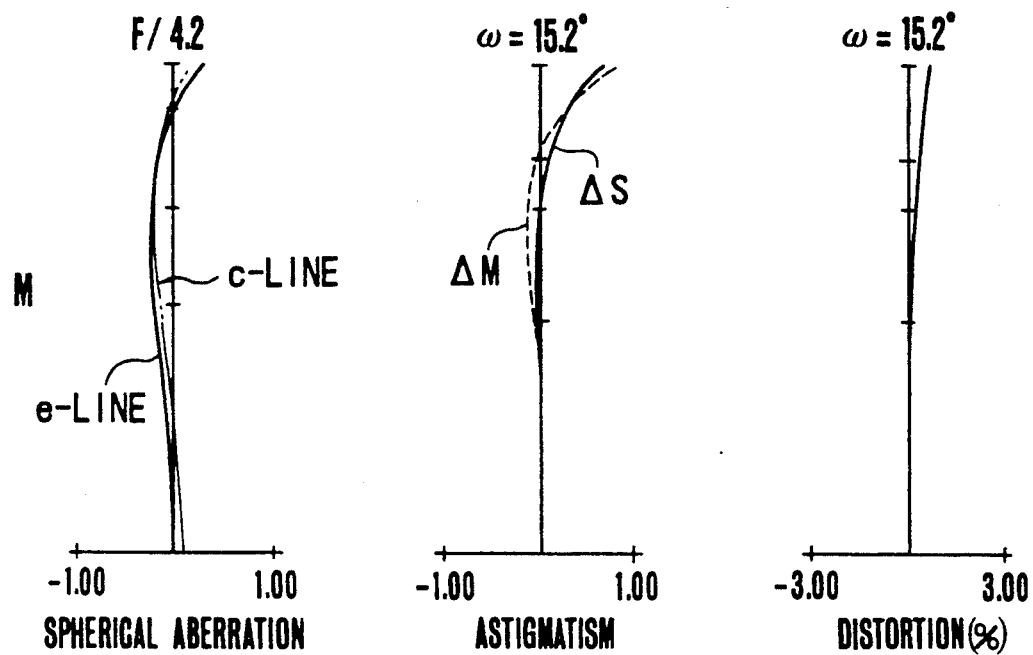
Figure 5C:
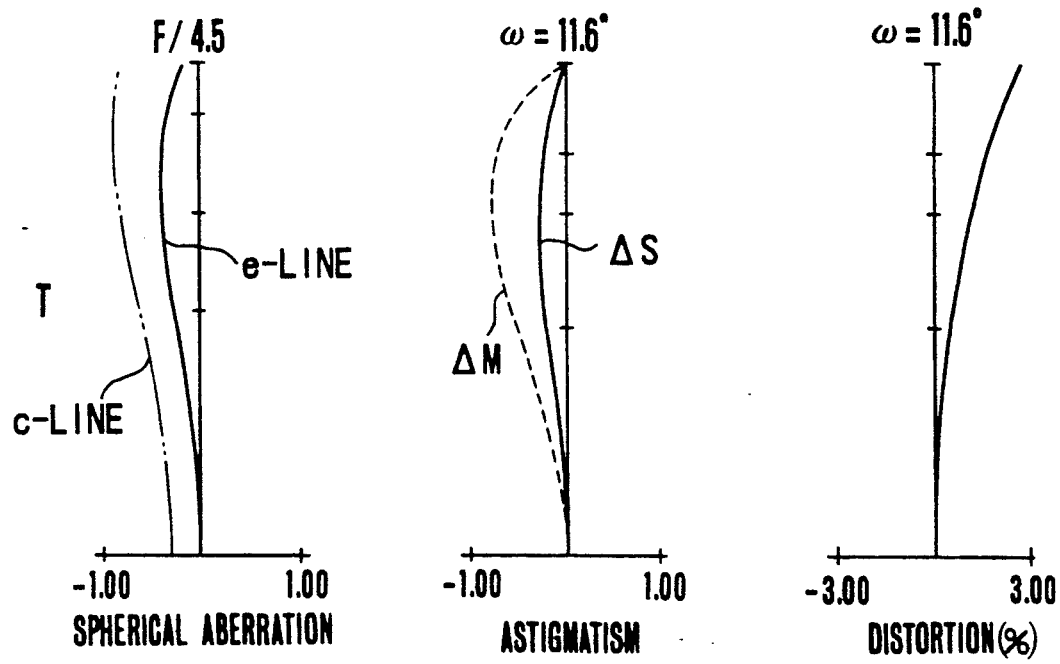
Figure 6A:
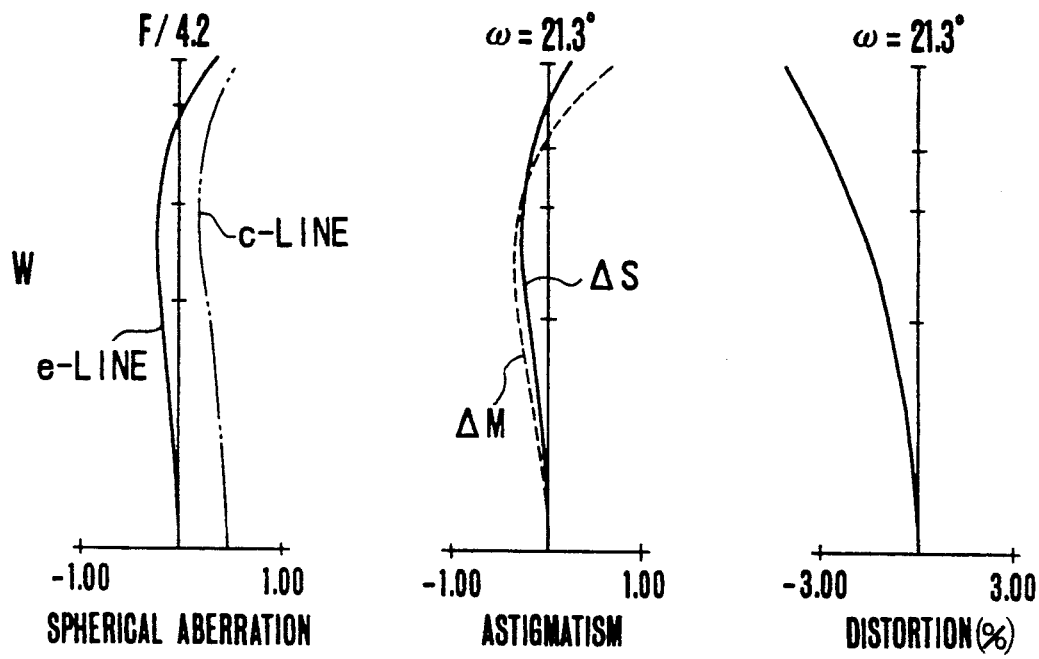
Figure 6B:
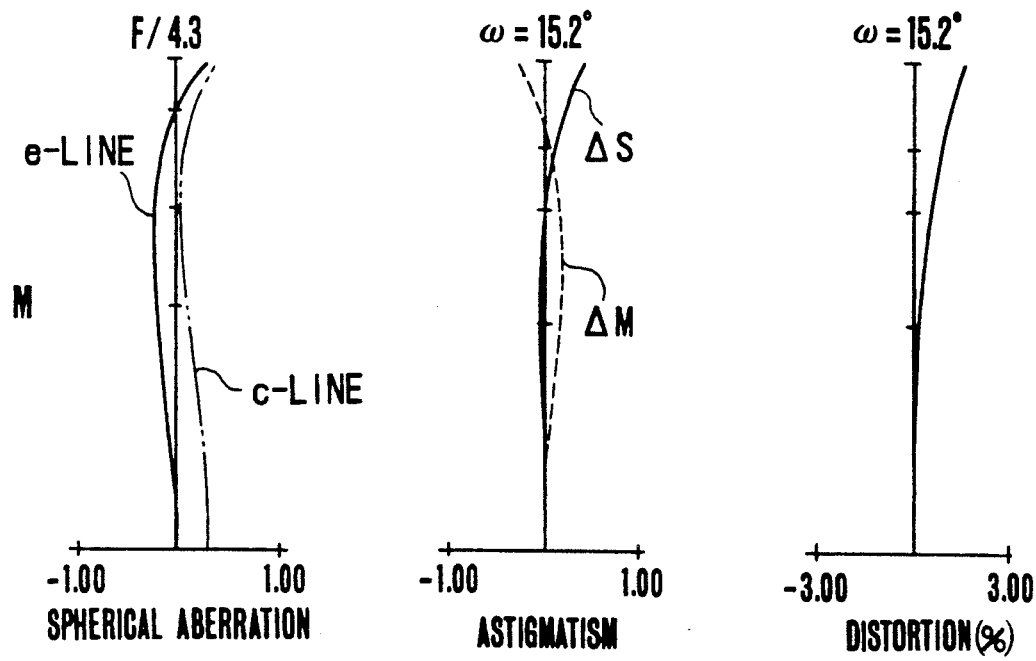
Figure 7:
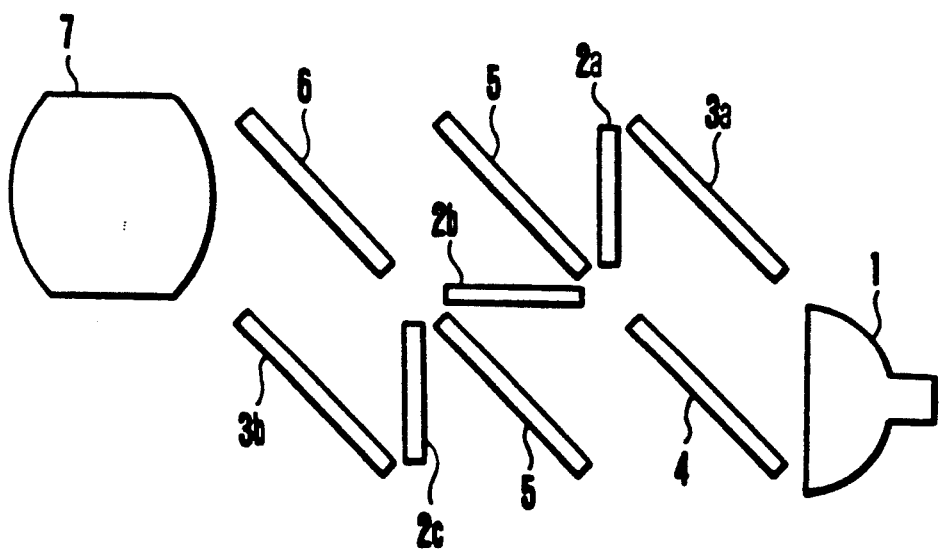
FIG. 7 is a schematic sectional view of the projector.

FIG. 1 to FIG. 3 in lens block diagrams correspond to the numerical examples 1 to 3 to be described later of the invention.

Reference Roman numeral I denotes a first lens unit having a positive refractive power and positioned facing a screen (large conjugate) side, II denotes a second lens unit having a negative refractive power, and III denotes a third lens unit having a positive refractive power and positioned facing an original image (small conjugate) side such as the liquid crystal display. When zooming from the wide-angle end to the telephoto end, these lens units move axially according to the respective loci shown by solid lines. Incidentally, W represents the wide-angle end, M the intermediate position, and T the telephoto end.

To solve the above-described problems, the invention then sets forth the before-described conditions (1), (2) and (3).

By the way, in the zoom lens of the present embodiment, the third lens unit having a positive refractive power and positioned facing the original image side moves toward the screen side when zooming from the wide-angle end to the telephoto end. It should be explained in this connection that because of the necessity of disposing the optical parts such as dichroic mirrors and others in a space between the last lens surface of the third lens unit and the original image, as has been mentioned above, the axial length of this space (hereinafter called the "back focal distance") must be secured long enough at the wide-angle end.

Here, in terms of the thin lens system, the back focal distance $S_W$ in the wide-angle end is given by the following expression:

$$S_W = (1 - (e_{IW} + e_{IIW})/f_I - (1 - e_{IW}/f_I)e_{IIW}/f_{II}) \cdot f_W \quad (A)$$

(where $e_{IW}$ is an interval between principal points of the first and second lens units at the wide-angle end). Because the separation between the first and second lens units becomes minimum at the wide-angle end, the interval $e_{IW}$ in the equation (A) cannot take a much larger value, so as to make compact the entire lens system. Then, the equation (A) is transformed into:

$$S_W = (k - e_{IIW} \cdot (1/f_I + 1/f_{II})) \cdot f_W \quad (B)$$

(where $k = 1 - e_{IW}/f_I + e_{IW} \cdot e_{IIW}/(f_I \cdot f_{II})$)

This equation (B) then reveals that if the value of $e_{IIW}$ and the value of $-(1/f_I + 1/f_{II})$ are made large, the back focal distance $S_W$ of the thin lens system becomes large. It is, therefore, understandable that even for the thick lens system, the back focal distance tends to increase.

Hence, when the lower limit of the inequalities of condition (1) is exceeded, it becomes difficult to maintain the long back focal distance. Meanwhile, when the upper limit is exceeded, the entire lens system conversely becomes large in size. So, it becomes difficult to achieve an advance in compactness.

Also, even when the lower limit of the inequalities of condition (2) is exceeded, it becomes likewise difficult to maintain the long back focal distance.

Meanwhile, when the upper limit of the inequalities of condition (2) is exceeded, it becomes difficult to achieve a compact lens system because the focal length $f_I$ of the first lens unit, too, becomes large and also because the total zooming movement of the first lens unit becomes large.

Further, when the lower limit of the inequalities of condition (3) comes to be exceeded, the focal length $|f_{II}|$ of the second lens unit becomes so small as to result in over-correction of field curvature which is difficult to correct by the other lens units. Also, barrel type distortion, too, is produced in the small conjugate plane (the liquid crystal display element). Particularly in the wide-angle end, correction of aberrations becomes difficult to perform.

Meanwhile, when the upper limit of the inequalities of condition (3) is exceeded, or when the focal length $|f_{II}|$ of the second lens unit is too large, the total zooming movement of the second lens unit becomes large, so that it becomes difficult to earn the predetermined zoom ratio.

Meanwhile, in the zoom lens of plus-minus-plus power arrangement as in the present invention, to further improve the optical performance, while securing the relatively long back focal distance, it is preferable that the third lens unit includes at least one negative lens, and that letting one of negative lenses of the third lens unit, which has the strongest negative refractive power, be denoted by a negative lens $III_2$, part of the third lens unit that lies on the large conjugate side of the negative lens $III_2$ be denoted by a lens group $III_1$, the focal length of the lens group $III_1$ be denoted by $f_{III1}$, and the radius of curvature of the lens surface of the small conjugate side of the negative lens $III_2$ be denoted by $r_A$, the following conditions are satisfied:

$$0.6 < r_A/f_W < 0.9 \quad (4)$$

$$0.5 < f_{III1}/f_W < 0.8 \quad (5)$$

The inequalities of condition (4) are concerned with the radius of curvature of the lens surface of the small conjugate side of the negative lens $III_2$. When the lower limit of the inequalities of condition (4) is exceeded, the spherical aberration and astigmatism occurring on the lens surface of the small conjugate side of the negative lens $III_2$ in the direction of over-correction increase, which are difficult to correct.

Meanwhile, when the upper limit of the inequalities of condition (4) is exceeded, the distortion of pincushion type produced on the small conjugate side by the lens surface of the small conjugate side of the negative lens $III_2$ decreases. Particularly in the wide-angle end, therefore, it becomes difficult to correct the distortion of barrel type produced by the second lens unit.

Also, the inequalities of condition (5) are to properly determine the focal length $f_{III1}$ of the lens group $III_1$. When the lower limit of the inequalities of condition (5) is exceeded, the principal point of the large conjugate side of the third lens unit nears the large conjugate side. Therefore, the value of the principal point interval $e_{IIW}$ defined in the equation (B) becomes small, so that it becomes difficult to maintain the long back focal distance. Conversely when the upper limit of the inequalities of condition (5) is exceeded, the spherical aberration produced in the direction of over-correction at the same time that the distortion is corrected by the lens surface of the small conjugate side of the negative lens $III_2$, becomes difficult to correct in the direction of under-correction.

Numerical examples 1 to 3 of the invention are shown below. In the numerical examples 1 to 3, Ri is the radius of curvature of the i-th lens surface, when counted from the screen side, Di is the i-th lens thickness or air separation, when counted from the screen side, and Ni and $\nu i$ re the refractive index and Abbe number of the glass of the i-th lens element, when counted from the screen side, respectively.

Incidentally, in the specific examples 1 to 3, focusing is performed by moving the first lens unit I along the optical axis. Also, the variable separation $D_8$ has its values shown with the screen at infinity.

The values of the factors in all the inequalities of conditions (1) to (5) for the numerical examples 1 to 3 are listed in the following table:

| Condition | Numerical Example | | |
| --- | --- | --- | --- |
| No. | 1 | 2 | 3 |
| (1) | 0.51 | 0.36 | 0.35 |
| (2) | 1.66 | 1.67 | 1.85 |
| (3) | 0.34 | 0.40 | 0.37 |
| (4) | 0.70 | 0.76 | 0.75 |
| (5) | 0.64 | 0.52 | 0.61 |

Numerical Example 1: (FIGS. 1, 4(A), 4(B) and 4(C))

$F = 137.02 - 259.90 \quad FNO = 1:4.6 - 4.6 \quad 2\omega = 43.6° - 23.8°$

| | | | |
| --- | --- | --- | --- |
| R1 = 184.250 | D1 = 3.40 | N1 = 1.81265 | $\nu 1$ = 25.4 |
| R2 = 86.361 | D2 = 10.25 | N2 = 1.51825 | $\nu 2$ = 64.1 |
| R3 = −195.381 | D3 = 0.20 | | |
| R4 = 78.888 | D4 = 6.50 | N3 = 1.51825 | $\nu 3$ = 64.1 |
| R5 = 692.328 | D5 = Variable | | |
| R6 = 752.975 | D6 = 2.20 | N4 = 1.71615 | $\nu 4$ = 53.8 |
| R7 = 59.192 | D7 = 6.43 | | |
| R8 = −69.334 | D8 = 2.20 | N5 = 1.79012 | $\nu 5$ = 44.2 |
| R9 = 45.686 | D9 = 6.60 | N6 = 1.85501 | $\nu 6$ = 23.9 |
| R10 = 78144.312 | D10 = Variable | | |
| R11 = 123.329 | D11 = 3.25 | N7 = 1.69979 | $\nu 7$ = 55.5 |
| R12 = 609.155 | D12 = 0.20 | | |
| R13 = 66.276 | D13 = 4.15 | N8 = 1.71615 | $\nu 8$ = 53.8 |
| R14 = 176.080 | D14 = 12.10 | | |
| R15 = −96.387 | D15 = 12.00 | | |
| R16 = 96.389 | D16 = 2.77 | | |
| R17 = −1095.148 | D17 = 6.70 | N10 = 1.71615 | $\nu 10$ = 53.8 |
| R18 = −95.311 | D18 = 0.20 | | |
| R19 = 279.687 | D19 = 4.75 | N11 = 1.71615 | $\nu 11$ = 53.8 |
| R20 = −124.272 | | | |

-continued

| Focal Length | 137.02 | 187.76 | 259.90 |
|---|---|---|---|
| D5 | 4.17 | 14.48 | 21.36 |
| D10 | 41.64 | 24.16 | 2.97 |

Numerical Example 2: (FIGS. 2, 5(A), 5(B) and 5(C))
F = 141.04 − 266.99   FNO = 1:4.2 − 4.5   2ω = 42.6° − 23.2°

| | | | |
|---|---|---|---|
| R1 = 111.178 | D1 = 3.50 | N1 = 1.81265 | ν1 = 25.4 |
| R2 = 60.235 | D2 = 8.86 | N2 = 1.71615 | ν2 = 53.8 |
| R3 = −6028.297 | D3 = Variable | | |
| R4 = 1232.586 | D4 = 2.50 | N3 = 1.77621 | ν3 = 49.6 |
| R5 = 64.385 | D5 = 6.93 | | |
| R6 = −54.053 | D6 = 2.50 | N4 = 1.60548 | ν4 = 60.7 |
| R7 = 120.665 | D7 = 4.36 | N5 = 1.85501 | ν5 = 23.9 |
| R8 = −290.544 | D8 = Variable | | |
| R9 = 131.491 | D9 = 4.64 | N6 = 1.60548 | ν6 = 60.7 |
| R10 = −241.619 | D10 = 0.20 | | |
| R11 = 114.097 | D11 = 4.11 | N7 = 1.71615 | ν7 = 53.8 |
| R12 = −1413.634 | D12 = 17.49 | | |
| R13 = −103.677 | D13 = 10.02 | N8 = 1.73429 | ν8 = 28.5 |
| R14 = 106.554 | D14 = 2.53 | | |
| R15 = 3002.135 | D15 = 4.15 | N9 = 1.69979 | ν9 = 55.5 |
| R16 = −120.317 | D16 = 0.20 | | |
| R17 = 386.058 | D17 = 4.66 | N10 = 1.69979 | ν10 = 55.5 |
| R18 = −147.290 | | | |

| Focal Length | 141.01 | 201.79 | 266.99 |
|---|---|---|---|
| D3 | 3.53 | 31.39 | 47.33 |
| D8 | 30.70 | 16.84 | 2.97 |

Numerical Example 3: (FIGS. 3, 6(A), 6(B) and 6(C))
F = 141.00 − 266.99   FNO = 1:4.2 − 4.5   2ω = 42.6° − 23.2°

| | | | |
|---|---|---|---|
| R1 = 114.491 | D1 = 3.20 | N1 = 1.85501 | ν1 = 23.9 |
| R2 = 73.067 | D2 = 8.23 | N2 = 1.60548 | ν2 = 60.7 |
| R3 = −586.907 | D3 = 0.20 | | |
| R4 = 124.195 | D4 = 3.16 | N3 = 1.60548 | ν3 = 60.7 |
| R5 = 153.714 | D5 = Variable | | |
| R6 = −598.485 | D6 = 2.20 | N4 = 1.77621 | ν4 = 49.6 |
| R7 = 65.786 | D7 = 6.26 | | |
| R8 = −57.697 | D8 = 2.20 | N5 = 1.60548 | ν5 = 60.7 |
| R9 = 93.237 | D9 = 4.60 | N6 = 1.85501 | ν6 = 23.9 |
| R10 = −389.529 | D10 = Variable | | |
| R11 = 276.232 | D11 = 4.28 | N7 = 1.60548 | ν7 = 60.7 |
| R12 = −138.926 | D12 = 0.20 | | |
| R13 = 91.269 | D13 = 4.63 | N8 = 1.71615 | ν8 = 53.8 |
| R14 = −888.411 | D14 = 1.69 | | |
| R15 = −131.983 | D15 = 2.50 | N9 = 1.73429 | ν9 = 28.5 |
| R16 = −390.509 | D16 = 20.00 | | |
| R17 = −544.918 | D17 = 2.50 | N10 = 1.76859 | ν10 = 26.5 |
| R18 = 105.061 | D18 = 2.94 | | |
| R19 = 3622.722 | D19 = 4.00 | N11 = 1.69979 | ν11 = 55.5 |
| R20 = −135.322 | D20 = 0.20 | | |
| R21 = 837.878 | D21 = 4.14 | N12 = 1.69979 | ν12 = 55.5 |
| R22 = −157.598 | | | |

| Focal Length | 141.00 | 202.29 | 266.99 |
|---|---|---|---|
| D5 | 3.48 | 31.23 | 47.77 |
| D10 | 28.36 | 15.68 | 3.00 |

Though, in the foregoing embodiment, the zoom lens has been formed into the 3-unit type, it may be also considered to add improvements to it by development to a 4-unit type to be described below.

Figure 8:
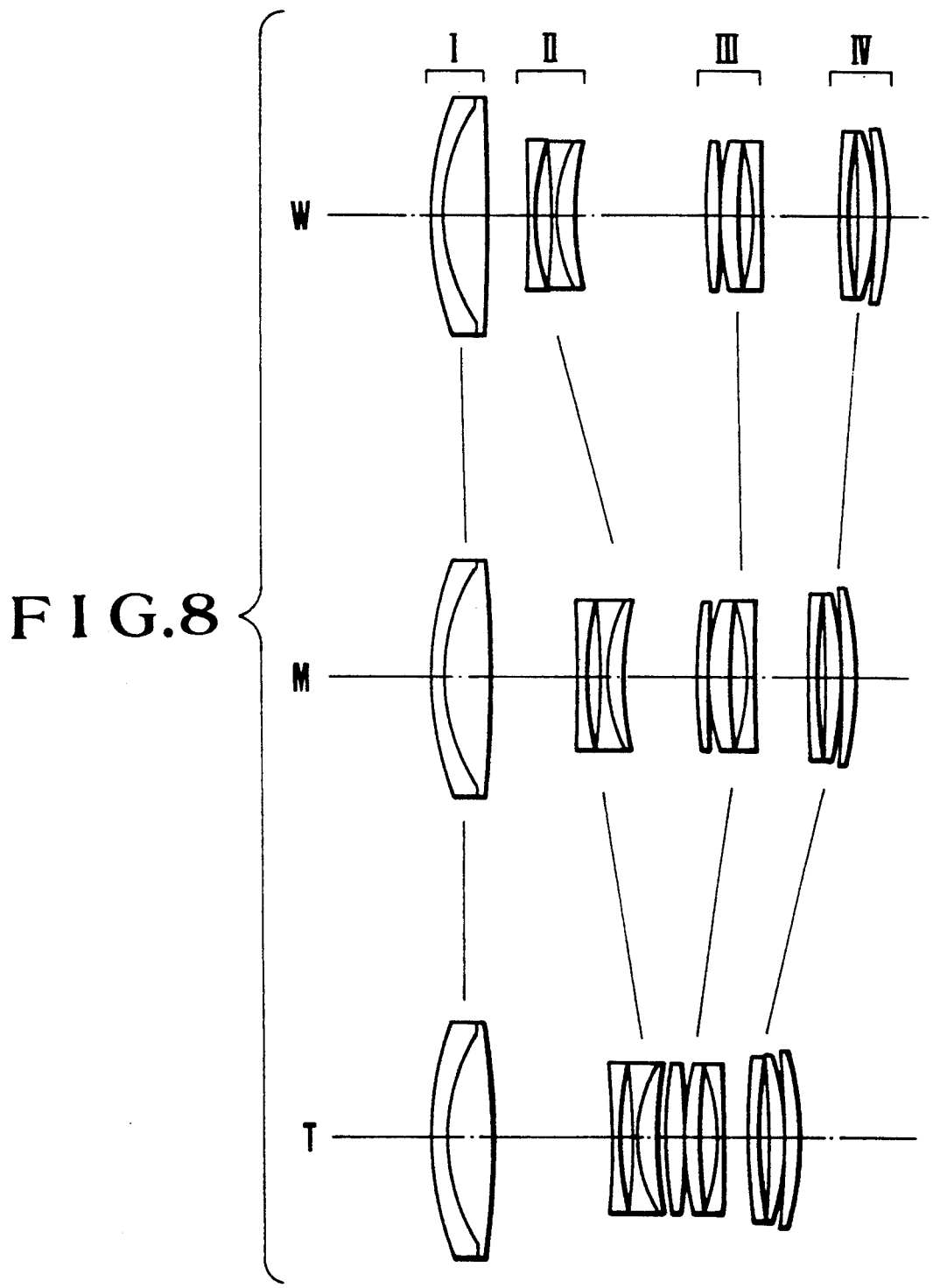
FIG. 8 to FIG. 10 are longitudinal section views of numerical examples 4 to 6 of zoom lenses of the invention, respectively.
Figure 9:
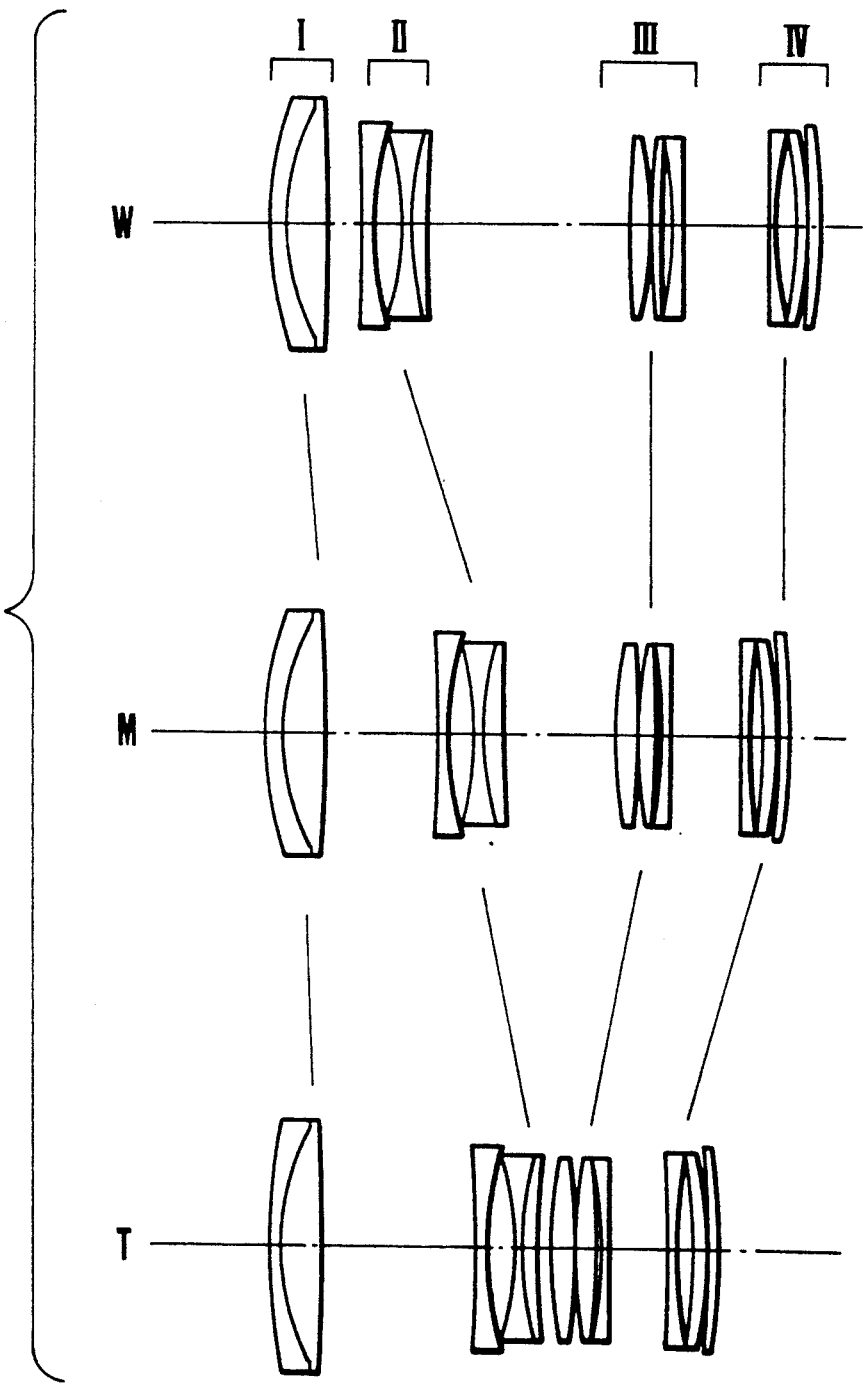
Figure 10:
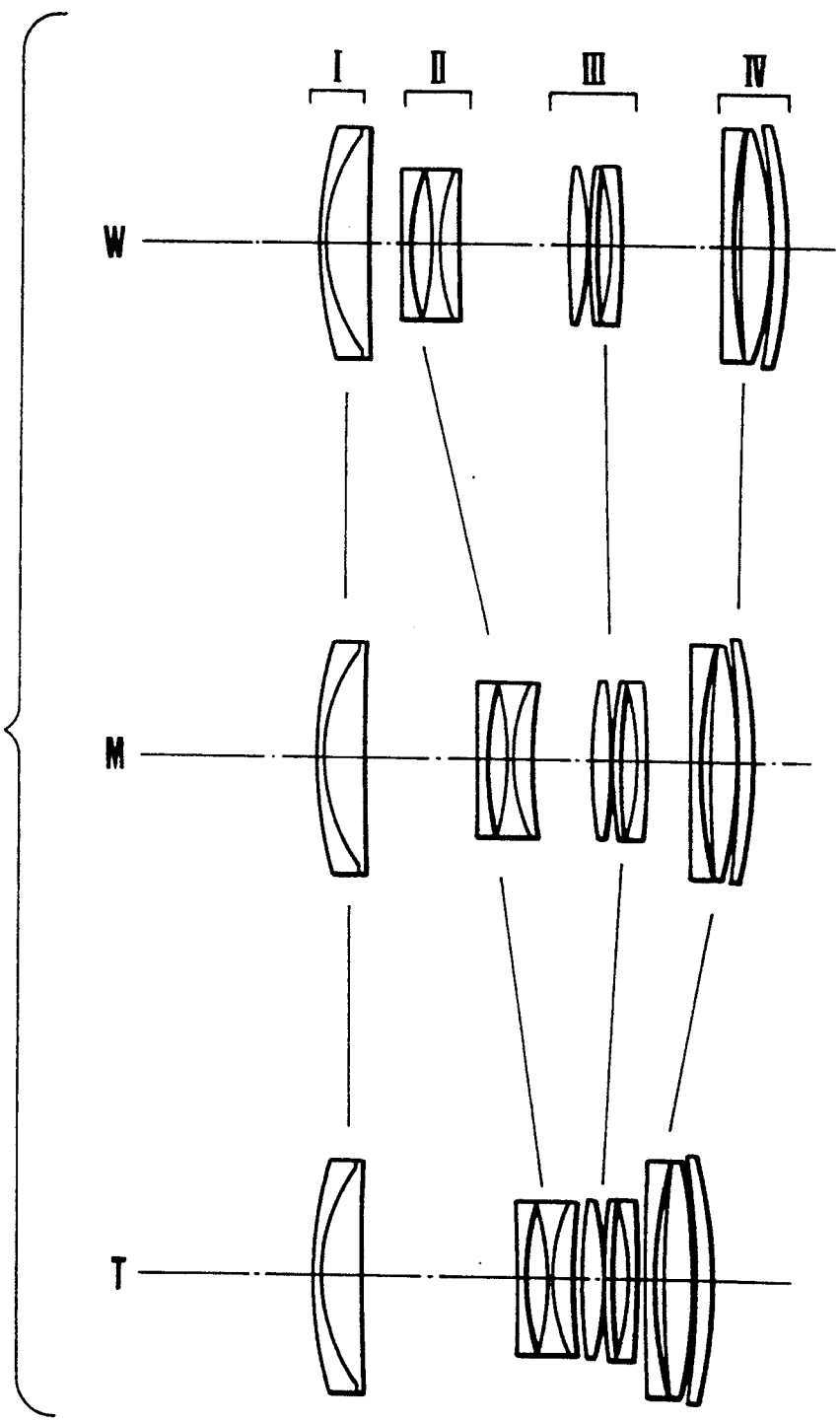
Figure 11A:
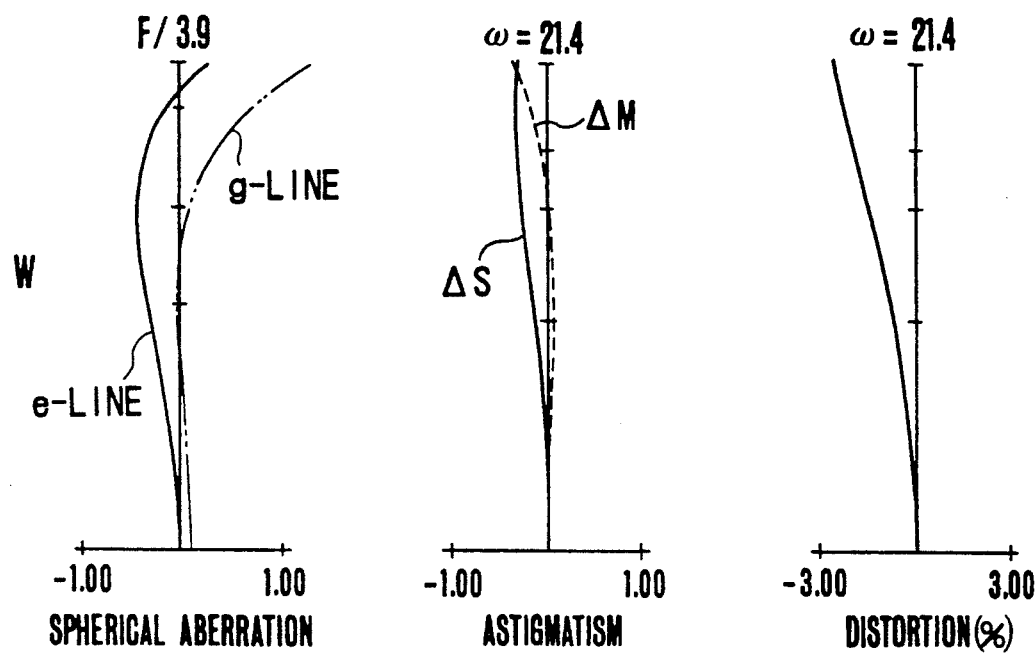
FIGS. 11(A), 11(B) and 11(C), FIGS. 12(A), 12(B) and 12(C), and FIGS. 13(A), 13(B) and 13(C) are graphic representations of the various aberrations of the zoom lenses of FIGS. 8 to 10 respectively appearing on the small conjugate plane disposed at a distance of 3/100 in magnification in the wide-angle end.
Figure 11B:
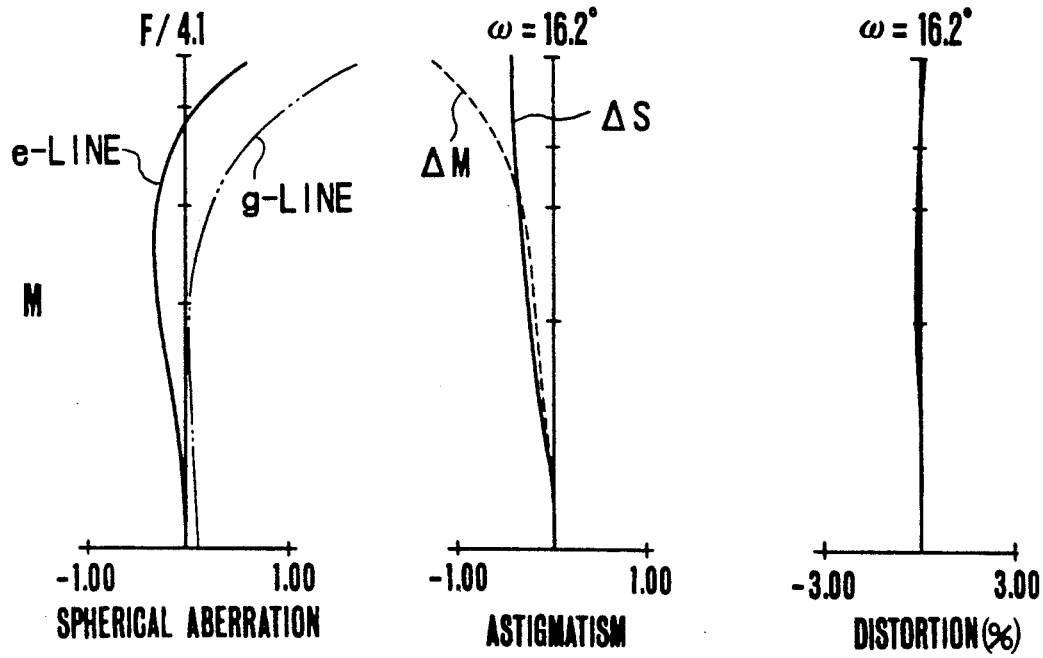
Figure 11C:
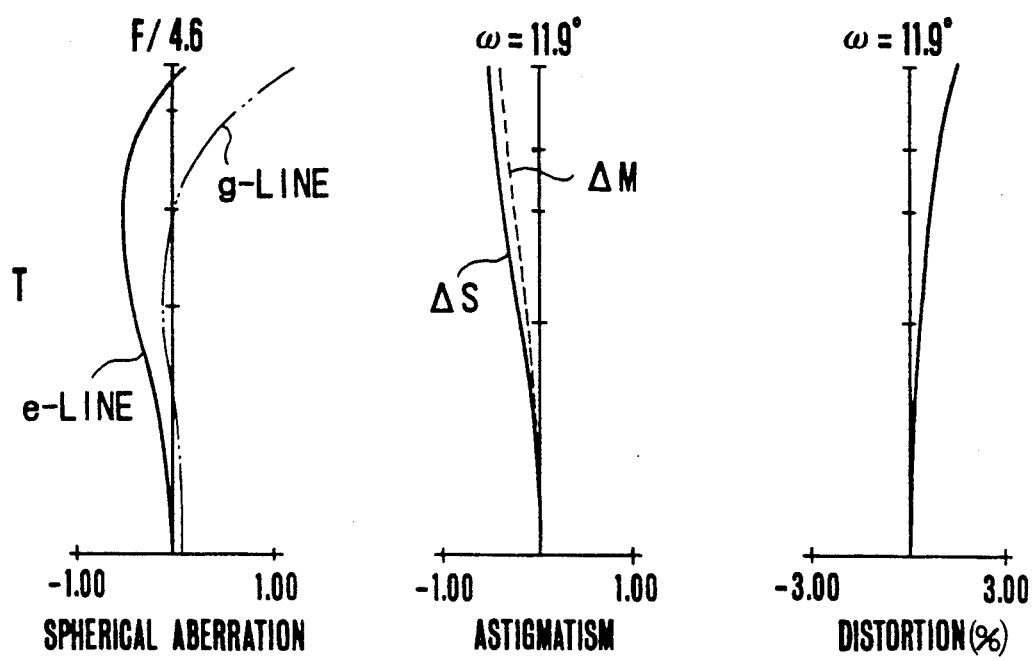
Figure 12A:
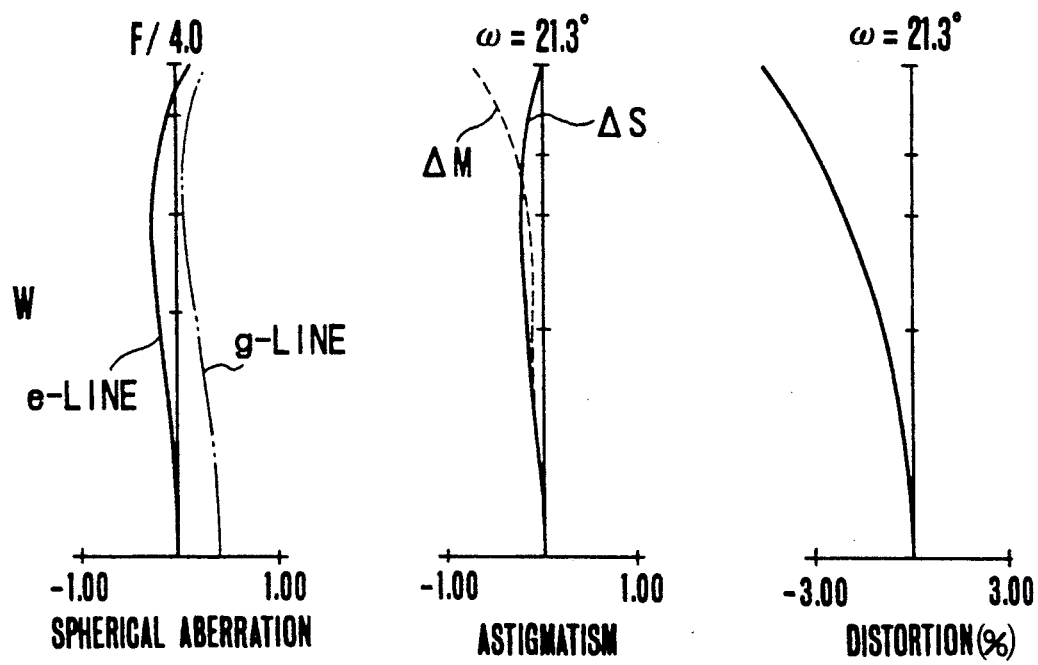
Figure 12B:
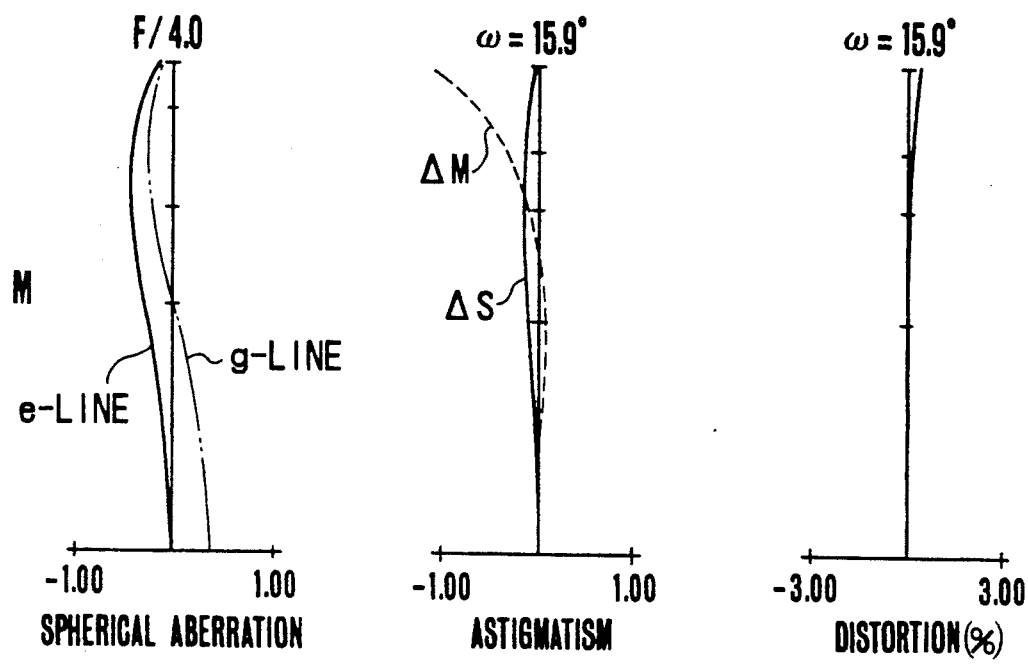
Figure 12C:
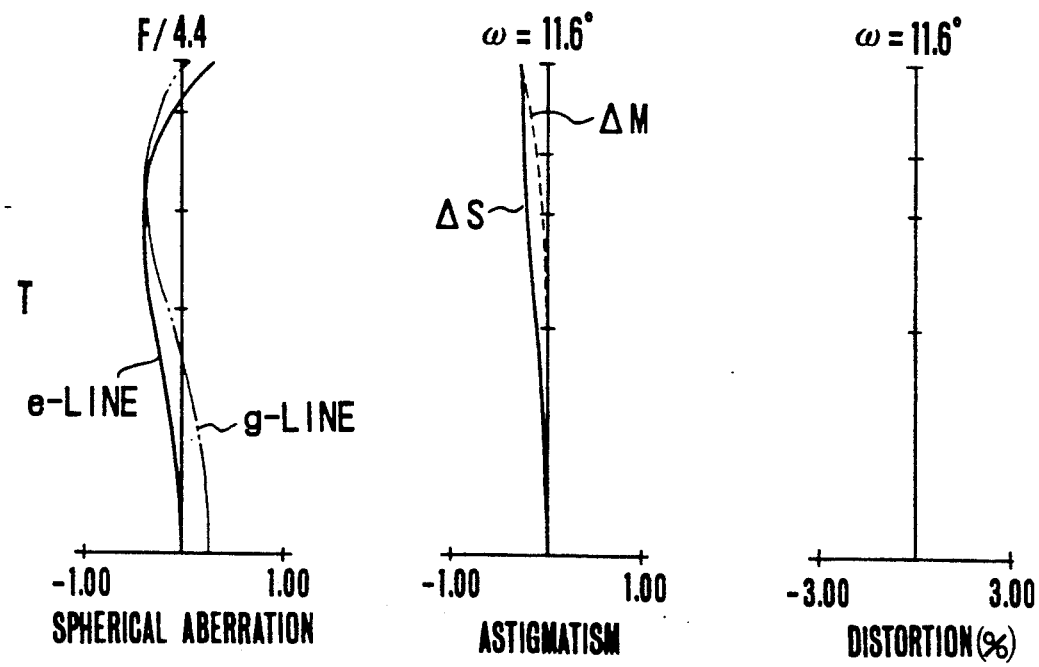
Figure 13A:
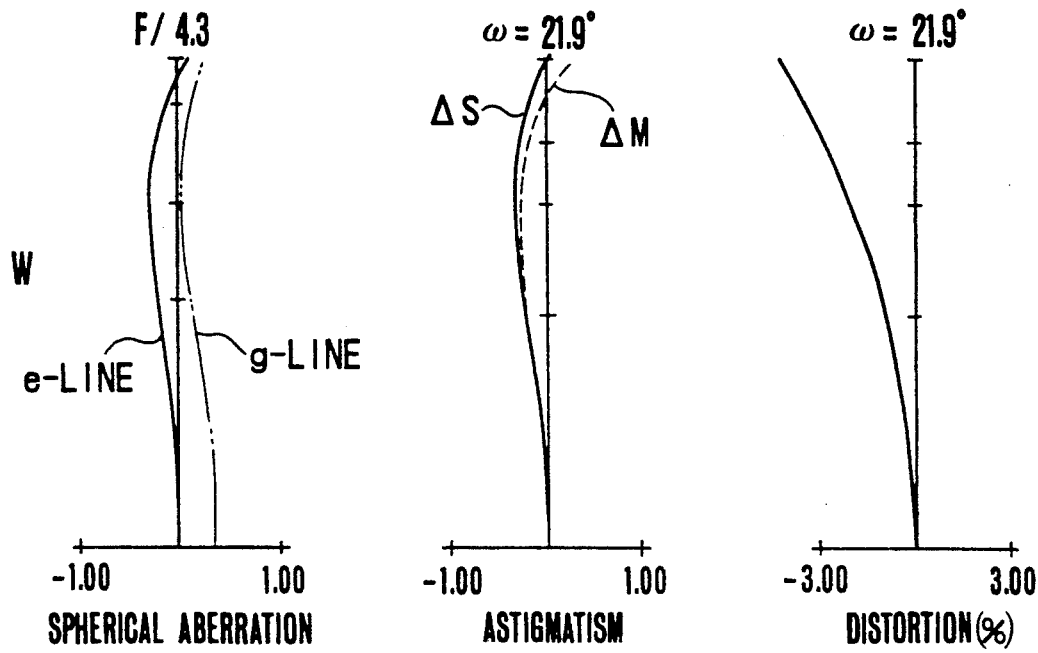
Figure 13B:
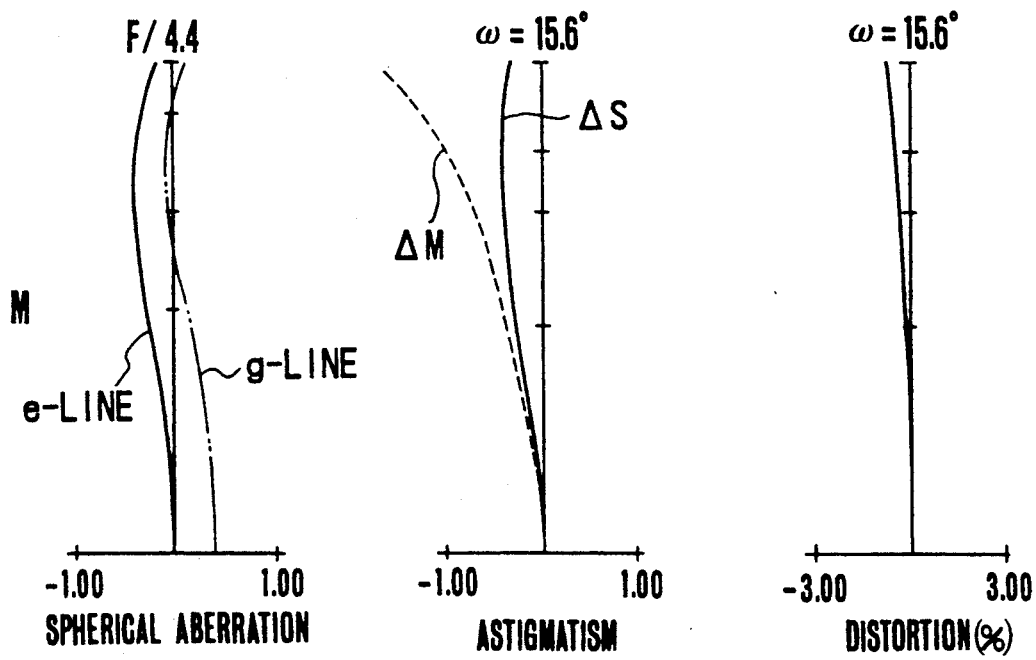
Figure 13C:
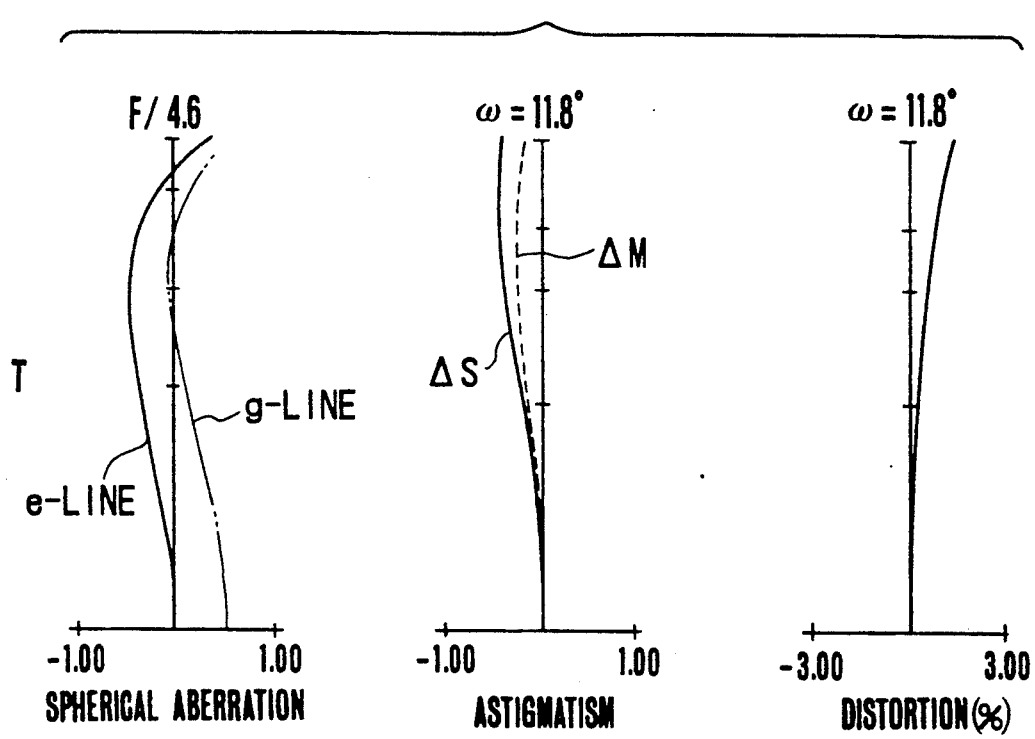

FIG. 8 shows a zoom lens of the 4-unit type comprising lens units I, II, III and IV having positive, negative, positive and positive refractive powers, arrangement being made such that, when zooming from the wide-angle end to the telephoto end, as shown by the solid lines, the separation between the first lens unit I and the second lens unit II increases, the separation between the second lens unit II and the third lens unit III decreases, and the separation between the third lens unit III and the fourth lens unit IV decreases under the condition that the fourth lens unit moves toward the screen side (not shown). Incidentally, in the drawings, W, T and M represent respectively the zooming positions at the wide-angle end, the telephoto end and the intermediate position.

In this type of zoom lens, the invention sets forth the following conditions:

$$0.1 < e_{IIW}/f_W < 0.6 \tag{1A}$$

$$1.2 < -(1/f_I + 1/f_{II}) \cdot f_W < 2.0 \tag{2A}$$

$$0.3 < -f_{II}/f_W < 0.5 \tag{3A}$$

$$0.3 < f_{III}/f_{IV} < 3.0 \tag{6}$$

where $f_I$, $f_{II}$, $f_{III}$ and $f_{IV}$ are the focal lengths of the first, second, third and fourth lens units, respectively, $f_W$ is the focal length of the entire lens system in the wide-angle end, and $e_{IIW}$ is an interval between principal points of the second and third lens units in the wide-angle end.

When the lower limit of the inequalities of condition (1A) is exceeded, it becomes difficult to maintain the long back focal distance. Meanwhile, when the upper limit is exceeded, the entire lens system is conversely large in size, so that it becomes difficult to achieve an advance in compactness.

Also, when the lower limit of the inequalities of condition (2A) is exceeded, a similar result is effected too, or it becomes difficult to maintain the long back focal distance.

Meanwhile, when the upper limit of the inequalities of condition (2A) is exceeded, the focal length $f_I$ of the first lens unit becomes so large and the total zooming movement of the first lens unit, too, becomes so large, that it becomes difficult to achieve a compact lens system.

Further, when the lower limit of the inequalities of condition (3A) is exceeded, the focal length $|f_{II}|$ of the second lens unit becomes so small as to result in over-correction of field curvature which is difficult to correct by the other lens units. Again, barrel distortion, too, is produced in the small conjugate plane (the liquid crystal element). Particularly in the wide-angle end, the aberrations become difficult to correct.

Meanwhile, when the upper limit of the inequalities of condition (3A) is exceeded, or when the focal length $|f_{II}|$ of the second lens unit is too large, the total zooming movement of the second lens unit becomes so large that it becomes difficult to achieve the predetermined zoom ratio.

Also, when the lower limit of the inequalities of condition (6) is exceeded too, it becomes difficult to maintain the long back focal distance. Conversely when the upper limit is exceeded, the fourth lens unit produces under-corrected spherical aberration on the original image side and barrel type distortion in the wide-angle end. These aberrations are difficult to correct well.

By satisfying all the above-described conditions, the object of the invention can be accomplished. Further, to maintain a further improved optical performance in the condition of the plus-minus-plus-plus power arrangement of the zoom lens with the security of the relatively long back focal distance, it is preferable that the fourth lens unit is constructed so as to have a negative lens on the large conjugate side. In more detail, by having the negative lens on the large conjugate side, the principal point of the small conjugate side of the fourth lens unit approaches the small conjugate side, making it easy to maintain the long back focal distance of the real thick lens system.

Furthermore, it is preferable to satisfy the following condition:

$$|r_A| > |r_B| \quad (7)$$

where $r_A$ and $r_B$ are the radii of curvature of the lens surfaces of the large and small conjugate sides of the aforesaid negative lens.

That is, when the condition represented by the inequality (7) is satisfied, the aberrations in the wide angle end, particularly the distortion of barrel type produced by the second lens unit, can be corrected by the aforesaid negative lens.

Numerical examples 4 to 6 of the invention are shown below. The symbols in the numerical examples 4 to 6 have the same meanings as those described before.

Incidentally, in the numerical examples 4 to 6, focusing is performed by moving the first lens unit along the optical axis. Again, the variable separations D have their values shown with the screen distance at infinity.

The values of the factors in the inequalities of conditions for the numerical examples 4 to 6 are listed in a table just below.

| Condition | Numerical Example | | |
|---|---|---|---|
| No. | 4 | 5 | 6 |
| (1A) | 0.10 | 0.42 | 0.24 |
| (2A) | 1.33 | 1.24 | 1.88 |
| (3A) | 0.45 | 0.48 | 0.36 |
| (6) | 2.92 | 0.38 | 0.65 |

Numerical Example 4: (FIGS. 8, 11(A), 11(B) and 11(C))
F = 140 − 260   FNO = 1:3.9 − 4.6   2ω = 42.8° − 23.8°

| | | | |
|---|---|---|---|
| R1 = 91.696 | D1 = 3.20 | N1 = 1.81265 | ν1 = 25.4 |
| R2 = 50.219 | D2 = 12.79 | N2 = 1.62689 | ν2 = 47.1 |
| R3 = −590.691 | D3 = Variable | | |
| R4 = −706.949 | D4 = 2.20 | N3 = 1.71615 | ν3 = 53.8 |
| R5 = 72.496 | D5 = 3.93 | | |
| R6 = −244.446 | D6 = 2.20 | N4 = 1.60548 | ν4 = 60.7 |
| R7 = 46.077 | D7 = 4.87 | | |
| R8 = 119.532 | D8 = Variable | N5 = 1.85501 | ν5 = 23.9 |
| R9 = 162.095 | D9 = 3.81 | N6 = 1.69979 | ν6 = 55.5 |
| R10 = −333.989 | D10 = 0.20 | | |
| R11 = 83.830 | D11 = 5.42 | N7 = 1.71615 | ν7 = 53.8 |
| R12 = 208.463 | D12 = 4.39 | | |
| R13 = −73.865 | D13 = 2.50 | N8 = 1.76859 | ν8 = 26.5 |
| R14 = −944.471 | D14 = Variable | | |
| R15 = 290.201 | D15 = 2.50 | N9 = 1.85501 | ν9 = 23.9 |
| R16 = 148.542 | D16 = 2.73 | | |
| R17 = −382.859 | D17 = 4.13 | N10 = 1.69979 | ν10 = 55.5 |
| R18 = −93.367 | D18 = 0.20 | | |
| R19 = −607.675 | D19 = 4.47 | N11 = 1.69979 | ν11 = 55.5 |
| R20 = −99.475 | | | |

| Focal Length | 140.01 | 189.51 | 259.99 |
|---|---|---|---|
| D3 | 6.23 | 20.52 | 30.04 |
| D8 | 37.70 | 21.29 | 2.99 |
| D14 | 23.36 | 15.87 | 7.55 |

Numerical Example 5 (FIGS. 9, 12(A), 12(B) and 12(C))
F = 141 − 267   FNO = 1:4.0 − 4.4   2ω = 42.6° − 23.2°

| | | | |
|---|---|---|---|
| R1 = 112.435 | D1 = 3.50 | N1 = 1.85501 | ν1 = 23.9 |
| R2 = 56.405 | D2 = 10.86 | N2 = 1.70557 | ν2 = 41.2 |
| R3 = −734.742 | D3 = Variable | | |
| R4 = −561.285 | D4 = 3.00 | N3 = 1.71615 | ν3 = 53.8 |
| R5 = 86.484 | D5 = 6.71 | | |
| R6 = −91.722 | D6 = 2.50 | N4 = 1.51825 | ν4 = 64.1 |
| R7 = 82.446 | D7 = 4.19 | N5 = 1.85501 | ν5 = 23.9 |
| R8 = 265.052 | D8 = Variable | | |
| R9 = 172.008 | D9 = 5.13 | N6 = 1.69979 | ν6 = 55.5 |
| R10 = −189.836 | D10 = 0.20 | | |
| R11 = 135.748 | D11 = 4.10 | N7 = 1.69979 | ν7 = 55.5 |
| R12 = −1798.821 | D12 = 2.32 | | |
| R13 = −115.436 | D13 = 2.50 | N8 = 1.70443 | ν8 = 30.1 |
| R14 = −981.089 | D14 = Variable | | |
| R15 = 749.469 | D15 = 2.50 | N9 = 1.79191 | ν9 = 25.7 |
| R16 = 134.162 | D16 = 3.34 | | |
| R17 = −345.926 | D17 = 4.13 | N10 = 1.69979 | ν10 = 55.5 |
| R18 = −104.723 | D18 = 0.20 | | |
| R19 = −370.671 | D19 = 3.44 | N11 = 1.69979 | ν11 = 55.5 |
| R20 = −144.238 | | | |

| Focal Length | 141.02 | 192.92 | 266.97 |
|---|---|---|---|
| D3 | 3.72 | 23.82 | 34.65 |
| D8 | 52.15 | 30.60 | 4.33 |
| D14 | 23.55 | 17.66 | 15.16 |

Numerical Example 6: (FIGS. 10, 13(A), 13(B) and 13(C))
F = 137 − 263   FNO = 1:4.3 − 4.6   2ω = 43.8° − 23.6°

| | | | |
|---|---|---|---|
| R1 = 84.279 | D1 = 3.00 | N1 = 1.85501 | ν1 = 23.9 |
| R2 = 45.082 | D2 = 11.04 | N2 = 1.70557 | ν2 = 41.2 |
| R3 = 8148.500 | D3 = Variable | | |
| R4 = 366.559 | D4 = 2.20 | N3 = 1.71615 | ν3 = 53.8 |
| R5 = 58.609 | D5 = 5.12 | | |
| R6 = −88.197 | D6 = 2.20 | N4 = 1.69979 | ν4 = 55.5 |
| R7 = 46.550 | D7 = 4.86 | | |
| R8 = 171.651 | D8 = Variable | N5 = 1.85501 | ν5 = 23.9 |
| R9 = 142.710 | D9 = 4.82 | N6 = 1.69979 | ν6 = 55.5 |
| R10 = −121.323 | D10 = 0.20 | | |
| R11 = 99.903 | D11 = 2.81 | N7 = 1.69979 | ν7 = 55.5 |
| R12 = 206.085 | D12 = 3.68 | | |
| R13 = −77.544 | D13 = 2.50 | N8 = 1.79191 | ν8 = 25.7 |
| R14 = −176.898 | D14 = Variable | | |
| R15 = 1136.558 | D15 = 2.50 | N9 = 1.85501 | ν9 = 23.9 |
| R16 = 130.224 | D16 = 2.81 | | |
| R17 = 587.439 | D17 = 6.49 | N10 = 1.69979 | ν10 = 55.5 |
| R18 = −115.698 | D18 = 0.20 | | |
| R19 = −455.150 | D19 = 4.66 | N11 = 1.69979 | ν11 = 55.5 |
| R20 = −124.607 | | | |

| Focal Length | 136.87 | 196.58 | 263.27 |
|---|---|---|---|
| D3 | 4.25 | 25.19 | 36.46 |
| D8 | 29.16 | 15.81 | 2.97 |
| D14 | 26.86 | 11.73 | 2.99 |

As has been described above, a zoom lens is constructed with a first lens unit, when counted from the screen side, of positive refractive power, a second lens unit of negative refractive power and a third lens unit of positive refractive power, wherein the separation between the first lens unit and the second lens unit increases, the separation between the second lens unit and the third lens unit decreases, and the third lens unit moves toward the screen side to effect zooming from the wide-angle end to the telephoto end, whereby the power arrangement is figured out to achieve impartment of a long back focal distance into the zoom lens. Thus, this zoom lens can be used as a projection lens for the color liquid crystal projection TV set.

What is claimed is:

1. A zoom lens comprising in order from a large conjugate side, a first lens unit having a positive refractive power, a second lens unit having a negative refractive power and a third lens unit having a positive refractive power, wherein when zooming from a wide-angle end to a telephoto end a separation between the first lens unit and the second lens unit increases while a separation between the second lens unit and third lens unit decreases, and the third lens unit moves toward the large conjugate side, wherein letting the focal length of the entire lens system at the side-angle end be denoted by $f_W$, the focal length of the first lens unit by $F_I$, the focal length of the second lens unit by $f_{II}$; the interval between principal points of the second lens unit and third lens unit at the wide-angle end by $e_{IIW}$; the following conditions are satisfied:

$$0.3 < e_{IIW}/f_W < 0.6$$

$$1.5 < -(1/f_I + 1/f_{II}) \cdot f_W < 2.0$$

$$0.3 < -f_{II}/f_W < 0.45$$

wherein further said third lens unit has at least one negative lens, satisfying the following conditions:

$$0.6 < r_A/f_W < 0.9$$

$$0.5 < f_{IIIl}/f_W < 0.8$$

where $f_{IIIl}$ is the focal length of lens group of said third lens unit which lies on the large conjugate side of a negative lens having the strongest negative refractive power among said third lens unit, and $r_A$ is the radius of curvature of a lens surface on a small conjugate side of the negative lens having the strongest negative refractive power.

2. A zoom lens comprising, in the order from a large conjugate side, a first lens unit having a positive refractive power, a second lens unit having a negative refractive power, a third lens unit having a positive refractive power and a fourth lens unit having a positive refractive power, wherein when zooming from a wide-angle end to a telephoto end, a separation between said first lens unit and said second lens unit increases, a separation between said second lens unit and said third lens unit decreases, a separation between said third lens unit and said fourth lens unit decreases, and said fourth lens unit moves toward the large conjugate side, whereby letting the focal length of the entire lens system at the wide-angle end be denoted by $f_W$, the focal lengths of said first, second, third and fourth lens units by $f_I$, $f_{II}$, $f_{III}$ and $f_{IV}$ respectively, and an interval between principal points of said second lens unit and said third lens unit by $e_{IIW}$, the following conditions are satisfied:

$$0.1 < e_{IIW}/f_W < 0.6$$

$$1.2 < -(1/f_1 + 1/f_{II}) \cdot f_W < 2.0$$

$$0.3 < -f_{II}/f_W < 0.5$$

$$0.3 < f_{III}/f_{IV} < 3.0$$

3. A zoom lens comprising, in order from a large conjugate side, a first lens unit having a positive refractive power, a second lens unit have a negative refractive power, and a third lens unit having a positive refractive power, wherein when zooming from a wide-angle end to a telephoto end a separation between the first lens unit and the second lens unit increases while a separation between the second lens unit and the third lens unit decreases, and the third lens unit moves toward the large conjugate side, wherein letting the focal length of the entire lens system at the wide-angle end be denoted by $f_W$; the focal length of the first lens unit by $f_I$; the focal length of the second lens unit by $f_{II}$; the interval between principal points of the second lens unit and third lens unit at the wide-angle end by $e_{IIW}$; the following conditions are satisfied:

$$0.3 < e_{IIW}/f_W < 0.6$$

$$1.5 < -(1/f_I + 1/f_{II}) \cdot f_W < 2.0$$

$$0.3 < -f_{II}/f_W < 0.45$$

wherein further said third lens unit comprises at least one negative lens satisfying the following conditions:

$$0.6 < r_A/r_W < 0.9$$

wherein $r_A$ is the radius of curvature of a lens surface on a small conjugate side of the negative lens having the strongest negative refractive power.

4. A zoom lens according to claim 3 wherein said third lens unit includes a negative lens having the strongest negative refractive power and also satisfies the condition $$0.5 < f_{IIIl}/f_W < 0.8$$

wherein $f_{IIIl}$ is the focal length of a lens which lies at a conjugate side larger than the negative lens of the third lens unit.

5. A zoom lens comprising, in order from a large conjugate side, a first lens unit having a positive refractive power, a second lens unit having a negative refractive power and a third lens unit having a positive refractive power, wherein when zooming from a wide-angle end to a telephoto end a separation between the first lens unit and the second lens unit increases while a separation between the second lens unit and the third lens unit decreases, and the third lens unit moves toward the large conjugate side, wherein letting the focal length of the entire lens system at the wide-angle end be denoted by $f_W$; the focal length of the first lens unit by $f_I$; the focal length of the second lens unit by $f_{II}$; the interval between principal points of the second lens unit and third lens unit at the wide-angle end by $e_{IIW}$; the following conditions are satisfied:

$$0.3 < e_{IIW}/f_W < 0.6$$

$$1.5 < -(1/f_I + 1/f_{II}) \cdot f_W < 2.0$$

$$0.3 < -f_{II}/f_W < 0.45$$

wherein further said third lens unit comprises a sub-lens unit having the largest air separation among the third lens unit and a positive refractive power and is positioned on a large conjugate side of the air separation, and a negative lens of bi-concave shape adjacent to the air separation on a small conjugate side of the air separation.

6. A zoom lens according to claim 5, further comprising two positive lenses that lie on the small conjugate side of the bi-concave negative lens.

7. A zoom lens according to claim 5, wherein said sub-unit includes a negative lens adjacent to the air separation.

* * * * *

UNITED STATES PATENT AND TRADEMARK OFFICE
CERTIFICATE OF CORRECTION

PATENT NO. : 5,227,919
DATED : July 13, 1993
INVENTOR(S) : KOUTARO YANO

It is certified that error appears in the above-indentified patent and that said Letters Patent is hereby corrected as shown below:

COLUMN 4:
line 30, "re" should read --are--.

COLUMN 8:
line 67, "side-angle" should read --wide-angle--.

COLUMN 9:
line 9, "$0.3<-f_{II}f_w<0.45$" should read
--$0.3 < -f_{II}/f_w < 0.45$--; and
line 53, "have" should read --having--.

COLUMN 10:
line 18, "claim 3" should read --claim 3,--; and
line 21, "condition" should read --condition:--.

Signed and Sealed this

Seventh Day of June, 1994

Attest:

BRUCE LEHMAN

Attesting Officer    Commissioner of Patents and Trademarks